Sept. 2, 1941.  W. M. ZAIKOWSKY  2,254,341
LUBRICATING METHOD AND APPARATUS THEREFOR
Filed Sept. 22, 1937  3 Sheets-Sheet 1
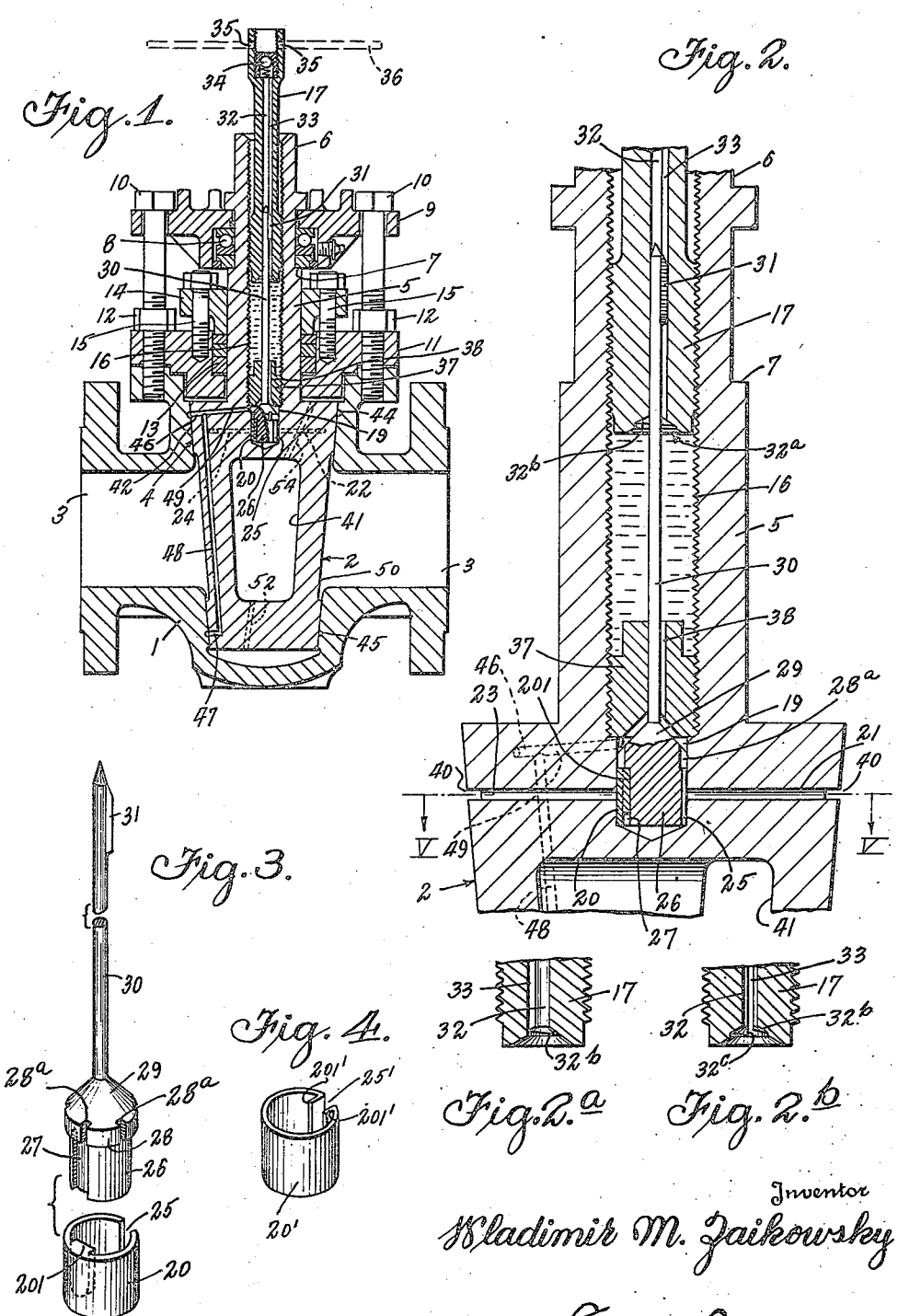
Inventor
Vladimir M. Zaikowsky
By Lyon & Lyon
Attorneys

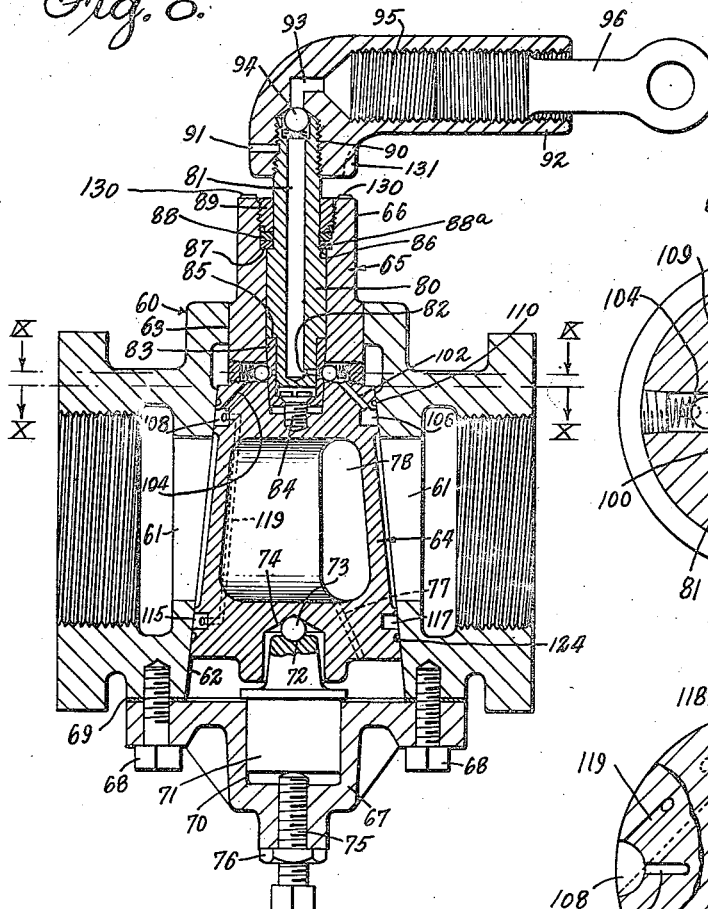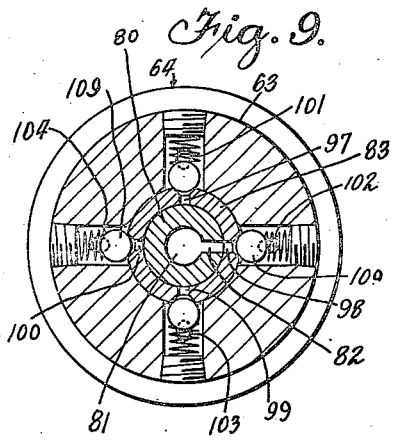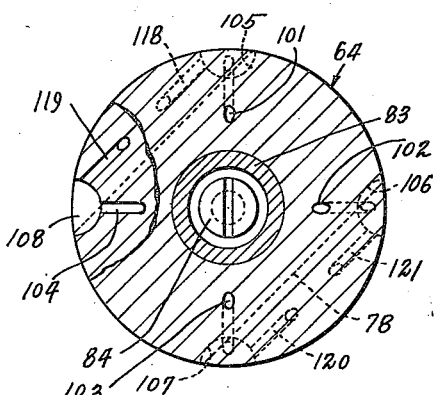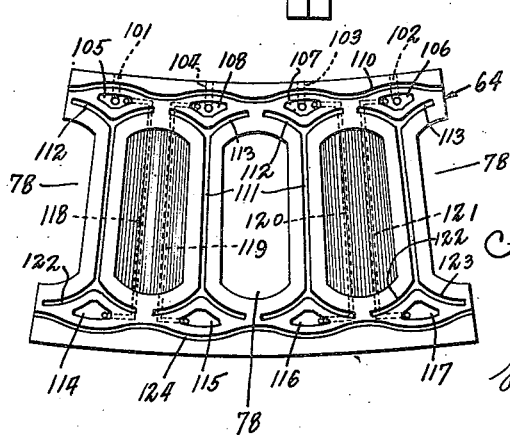

Patented Sept. 2, 1941

2,254,341

UNITED STATES PATENT OFFICE 2,254,341

LUBRICATING METHOD AND APPARATUS THEREFOR

Wladimir M. Zaikowsky, Pasadena, Calif., assignor of twenty-five per cent to Samuel S. MacKeown, Pasadena, Calif.

Application September 22, 1937, Serial No. 165,112

27 Claims. (Cl. 251—93)

This invention relates to lubricating systems and is especially applicable to the lubrication of bearing surfaces subjected to high and/or unequally distributed pressures and to bearing surfaces which are sometimes stationary with respect to each other for relatively long intervals of time, permitting the original lubricant to be squeezed out and the bearing surfaces to contact directly so that it is advisable, or necessary, to provide a new film of lubricant between the surfaces before they are moved relative to each other.

A broad object of the invention is to positively introduce lubricant between bearing surfaces over the entire contact area thereof.

Another object is to positively introduce lubricant between bearing surfaces at the contact area, or areas, thereof where it is most needed, namely where the bearing pressures are greatest and/or the bearing surfaces are in direct contact or even "frozen" together.

Another object is to provide simple and practicable methods and apparatus for supplying lubricant to bearings in the manner described.

Other more specific objects and features of the invention will appear from the detailed description which follows:

As previously indicated, in devices having bearing surfaces exposed to high and/or unequal pressures or in which the bearing surfaces may remain for relatively long times without any relative movement, lubricant may be squeezed out from between portions of the bearing surfaces where the pressure is greatest, often leaving a metal-to-metal contact between the surfaces. In order to properly lubricate a bearing in this condition it is necessary to break the metal-to-metal seal and to produce a film of lubricant between all portions of the bearing surfaces. It has been common in the past to provide such bearing surfaces with grooves or ducts for supplying lubricant under pressure to a number of spaced apart points on the bearing surfaces and interconnect these grooves or ducts to a common source of lubricant under pressure. With such an arrangement lubricant is supplied under substantially equal pressure to all of the grooves or ducts in the bearing surface and it is difficult, or impossible, to produce the film of lubricant between all portions of the bearing surfaces if the pressure between the surfaces at different points is unequal. Thus as the lubricant pressure is increased, lubricant is extruded first from the grooves in the bearing surfaces where the pressure is least, or the clearance is greatest (and incidentally where lubricant is needed the least); furthermore this extruded lubricant exerts a pressure on the bearing surfaces where the pressure is greatest and increases the clearance where the clearance was already the greatest, thereby further precluding the possibility of forcing lubricant between those portions of the bearing surfaces where the pressure is greatest and metal-to-metal contact may exist. A barely perceptible initial irregularity of lubricant flow tends to grow progressively.

As an example of bearing surfaces under high and/or unequal pressure, a valve used for controlling the flow of fluids under high pressure, is typical. Such a valve may be either of the gate type or of the plug type, containing either a wedge-shaped or a conical or cylindrical plug. When any such valve is in the closed position the line fluid forces the gate or plug against the casing or valve body on the outlet side. In the case of a plug valve this pressure may be sufficient to force lubricant from the bearing surfaces on the outlet side if the valve remains for a long time in the closed position and it may be impossible to turn the valve or it may be the valve can be turned only with great difficulty and with excessive resultant wear. If ducts are provided for lubricant around both the inlet and outlet ports of the plug and if these ducts are connected to a single source of lubricant under pressure, as has been done in the past, then the lubricant will be extruded from some ducts adjoining the inlet port and not from the ducts near the outlet port. The pressure of the lubricant extruded on the side of the inlet port may even increase the pressure between the bearing surfaces of the outlet side and may make the valve more difficult to operate than if no attempt were made to lubricate it.

In accordance with the present invention, I have discovered that if lubricant under pressure is supplied to a number of ducts or grooves, spaced around the valve, one at a time and independently, it is possible to provide a film of lubricant at substantially all points between the bearing surfaces and particularly between those portions of the bearing surfaces exposed to the greatest pressure. To produce this result, it is necessary that the lubricating grooves be isolated from each other so that the lubricant pressure obtainable in the grooves where the bearing pressure is greatest may not be limited by the escape of lubricant from grooves where the pressure is least. If approximately equal quantities of lubricant are forced consecutively into each of the grooves, then the greatest lubricant pressure is produced in those grooves where the pressure between the bearing surfaces is greatest and the clearance is least, the pressure in the grooves being determined by the resistance to the extrusion of lubricant from the grooves. Since the lubricant pressure will be highest at the surface areas where the pressure resulting from external forces is greatest the lubricant pressure will act automatically to equalize the total forces acting upon the valve plug.

For best results and to prevent the production of excessively large pressures in any one groove, relatively small amounts of lubricant should be forced rapidly and consecutively into each of the grooves and the process repeated until the valve is completely lubricated and can operate properly. In this way a bearing may be properly lubricated by a standardized procedure irrespective of variously distributed clearances or pressures between the bearing surfaces.

If sufficient clearance does not initially exist between the bearing surfaces adjacent a groove to allow extrusion of lubricant from the groove between the surfaces, it is possible to produce a lubricant pressure in a groove great enough to elastically deform the plug and casing of the valve and thus allow the lubricant to spread. Once the lubricant starts to spread from the groove the area over which the pressure is exerted is increased so that the lubricant will continue to spread as more lubricant is forced into the groove. It is thus possible, by the concentrating of the lubricant in a groove within the area of the bearing surfaces under greatest pressure, to separate and lubricate the bearing surfaces even when they have been "frozen" by corrosion, rust, etc.

The invention will now be explained by describing in detail certain valve structures incorporating it. However, it is to be understood that the invention is not limited to valves or to valves of the particular type illustrated, but is useful in many bearings which have hitherto been difficult to lubricate.

In the drawings:

Fig. 1 is a longitudinal sectional view through a plug valve incorporating a lubricating system in accordance with my invention.

Fig. 2 is an enlarged vertical sectional view through a portion of the plug of the valve shown in Fig. 1; the section being taken in a different plane from the plane of Fig. 1 to better illustrate certain lubricant passages in the plug.

Fig. 2a is a detail vertical sectional view of the lower end of the lubricant-compressing plug, the view being taken in the same plane but looking in the opposite direction from the section of Fig. 2.

Fig. 2b is a detail sectional view similar to that of Fig. 2a but with the section taken in a plane displaced 90° from the plane of section of Fig. 2a.

Fig. 3 is a detail perspective view of the lubricating valve element in the plug of Figs. 1 and 2.

Fig. 4 is a perspective view showing an alternative form of sleeve that may be employed in the valve mechanism of Fig. 3.

Fig. 8 is a longitudinal sectional view through a plug type valve, incorporating another embodiment of my lubricating system.

Fig. 9 is a cross section through the plug of the valve shown in Fig. 8, the view being taken approximately in the plane IX—IX of Fig. 8.

Fig. 10 is a cross section through the plug of the valve shown in Fig. 8, taken approximately in the plane X—X of Fig. 8.

Fig. 11 is a developed view of the bearing surface of the plug of the valve shown in Fig. 8.

Figure 5:
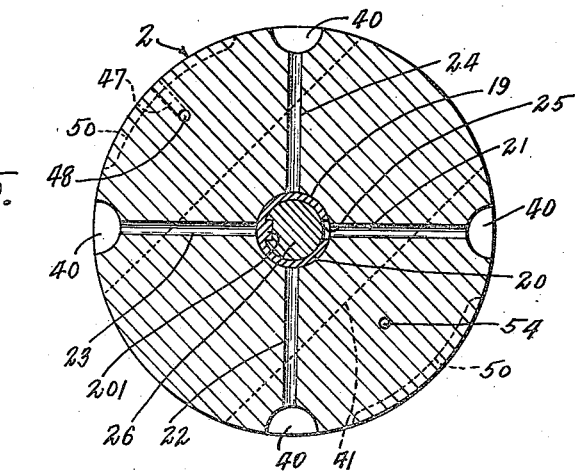
Fig. 5 is a horizontal section through the plug of Fig. 2, the section being taken in the plane V—V of Fig. 2.

Referring first to Fig. 1 the valve therein disclosed comprises a valve body 1 having rotatably mounted therein a valve plug 2. Thus the body 1 is provided with a fluid passage 3 extending longitudinally therethrough and adapted to be connected to inlet and outlet pipes. The passage 3 is intersected by a conical passage 4 extending downwardly through the top of the body 1. The bearing surface of the wall of the conical passage 4 is fitted to seal with the juxtaposed bearing surface on the plug 2.

The plug 2 is provided with a hollow stem 5 extending upwardly a substantial distance from the upper end of the plug proper which stem is provided with a square or hexagonal end 6 for the reception of a wrench used to turn the plug into open and closed position. The lower portion of the stem 5 is of greater diameter than the upper portion, thereby defining a shoulder 7 against which a ball bearing assembly 8 rests. A clamping member 9 having a central opening therein for the passage of the stem 6 is positioned above the bearing 8 and is secured to the body 1 of the valve by bolts 10. The bolts 10, member 9 and bearing 8 maintain the plug 2 in sealing engagement with the valve body 1 and prevent any lifting of the plug while at the same time permitting rotation of the plug to close and open the valve. That portion of the body member 1 immediately above the plug 2 is closed by a plate 11 secured in place by nuts 12 on the bolts 10, a gasket or other suitable means being provided between the plate 11 and the top of the body 1 to effect a fluid-tight seal. A fluid-tight seal is effected between the plate 11 and the stem 5 by packing 13 which is compressed between the stem 5 and the wall of an orifice provided therefor in the plate 11, by a gland 14 adapted to be tightened by means of bolts 15 threaded into apertures in the upper face of the plate 11. To equalize the pressures on the upper and lower ends of the plug 2, relief passages 52 and 54 may be provided, these passages extending from the line fluid passage 41 in the plug to the lower and upper end surfaces of the plug, respectively.

The structure so far described is in accordance with prior practice, and the lubricating system of this valve, which represents my invention in connection therewith, will now be described.

The stem 5 of the plug 2 is provided with a central cylindrical aperture 16, the wall of which is threaded through the major portion of its length to receive a lubricant-compressing plug 17 adapted to be screwed therein. Lubricant in the lower portion of the passage 16 is compressed in response to downward movement of the screw plug 17 and forced to the bearing surfaces of the valve 2 and the valve body 1.

Thus referring to Fig. 2, the lower end of the threaded portion of the passage 16 terminates in a cylindrical chamber 19 of smaller diameter. The cylindrical wall of the chamber 19 is fitted to seal with a split sleeve 20 (Fig. 3) positioned therein and has leading therefrom at 90° intervals thereabout four lubricant ducts 21, 22, 23 and 24 (Fig. 5), respectively. These lubricant ducts 21, 22, 23, and 24, inclusive, extend to recesses 40 in the outer or bearing surface of the plug, the function of which will be described later.

The sleeve 20 fits snugly within the chamber 19 and, as shown, is dimensioned to seal off all, or all but one, of the ducts 21, 22, 23 and 24, depending upon whether the slot 25 is juxtaposed to one of the ducts 21, 22, 23 and 24, inclusive, or is positioned in between two of said ducts. The sleeve, in addition to having a ground outer surface and being normally dimensioned to fit snugly within the chamber 19, is relatively thin and elastic so that the pressure of lubricant within the chamber 19 tends further to expand the sleeve outwardly against the cylindrical wall of chamber 19 and positively seal the ducts leading therefrom.

In the valve of Fig. 1 it is intended that the sleeve 20 shall be automatically rotated in response to rotation of the lubricant-compressing plug 17 to successively periodically deliver small quantities of lubricant to the ducts 21, 22, 23 and 24. To this end there is fitted loosely within the sleeve 20 a core 26 having a slot 27 (Fig. 3) therein, which registers with and engages an inwardly extending tongue 20l on the sleeve 20 so that the sleeve 20 is constrained to rotate with the core 26. Core 26 is provided at its upper end with an outwardly extending flange portion (having slots 28a therein for the passage of lubricant) 28 which fits loosely against the upper portion of the cylindrical wall of chamber 19 for free rotation therewithin and limited radial movement. The upper end of the core 26 above the flange 28 is tapered to define a conical face 29 which terminates in a stem 30 extending upwardly for a substantial distance and has a radially extending key 31 adjacent its upper end. The lubricant-compressing plug 17 (Figs. 1 and 2) is provided with a central passage 32 adapted to receive the stem 30, and a keyway 33 extends longitudinally along one side of the passage 32 to receive the key 31 on stem 30 so that the stem is constrained to rotate with the plug 17 although it is free to move vertically with respect thereto. The upper end of the plug 17 is enlarged and internally threaded at its open upper end to facilitate connection thereto of a lubricant-gun for forcing lubricant down through the passage 32 past the stem 30 into the space 16 below plug 17. To prevent return of lubricant a check valve 34 is provided immediately below the upper end of the plug 17. The upper end of plug 17 may also be provided with a pair of diametrically opposite apertures 35 for the insertion of a handle 36 whereby substantial torque may be applied to the plug 17 to rotate it.

To normally retain the sleeve 20 and the core 26 in position within the chamber 19, a bushing 37 is threaded into the lower end of the threaded portion of the passage 16, this bushing being provided with a central aperture for receiving and rotatably supporting the stem 30 and having a keyway 38 extendng from the aperture to permit passage of lubricant and also to permit insertion of the key 31 on stem 30 when the mechanism is assembled. The lower surface of the bushing 37 is preferably conical and ground to seal with the conical surface 29 on the upper end of core 26 and prevent the return flow of lubricant or fluid from the chamber 19 to the chamber 16, any such reverse flow carrying the core 26 and the stem 30 upwardly until the core seats against the bushing 37 and effects a seal therewith to prevent further escape of lubricant or fluid.

The chamber 16 may be replenished with lubricant by removing the plug 17, inserting a pellet of lubricant in chamber 16, forcing the pellet down around the stem 30, and re-inserting the plug 17 and screwing it down. To facilitate entry of the end of stem 30 into the passage 32, the upper end of the stem is tapered to a point and a tapered, funnel-shaped orifice 32a is provided at the lower end of the passage 32. To facilitate entry of the key 31 into the keyway 33, the orifice 32a is provided with a helical surface 32b the pitch of which is greater than the pitch of the screw threads on plug 17 to prevent axial pressure of the plug 17 on the upper end of key 31 as the latter is screwed down. As the surface 32b approaches the key 31, the latter will abut against one edge 32c (Fig. 2b) of the keyway and thereafter rotate with the plug and enter the keyway as the plug continues its downward movement. By this arrangement, the upper end of stem 30 is protected from damage when plug 17 is removed and offers minimum obstruction to the introduction of pellets of lubricant in view of the fact that it is always below the open edge of the lubricant-receiving chamber 16.

The apparatus so far described constitutes a distributing system for distributing lubricant either successively in measured or limited quantities to the various ducts 21, 22, 23 and 24 or for delivering lubricant or grease to one only of said ducts. Thus, if it is desired to successively distribute measured quantities of lubricant to each of the ducts 21, 22, 23 and 24, the chamber 16 is supplied with a quantity of lubricant and this lubricant then compressed by rotating the lubricant-compressing plug 17. Rotation of plug 17 gradually moves the plug downward within the passage 16 thereby applying pressure to the lubricant therebelow. At the same time the sleeve 20 is rotated within the chamber 19 by the core 26 and stem 30 to successively move the slot 25 in the sleeve past the ducts 21, 22, 23 and 24, successively, and deliver lubricant to each duct as the slot 25 passes the ducts. By reversely rotating plug 17 the port 25 of sleeve 20 can be repeatedly brought into registration with the ducts 21, 22, 23 and 24 without forcing lubricant into the chamber 19. Furthermore, chamber 19 remains isolated from the lubricant-receiving chamber 16, due to the sealing contact of the tapered surface 29 with the cooperating surface of plug 37. Therefore by such reverse rotation, it is possible to equalize the pressures in all the recesses 40 with the pressure within the chamber 19 since there are no return check valves in the ducts 21, 22, 23 and 24.

The chamber 16 may be filled with lubricant either by completely removing the plug 17, placing a pellet of lubricant within chamber 16, and re-inserting the plug 17 (as previously described), or by retracting the plug 17 to a point adjacent the upper end of the sleeve 6 and forcing lubricant from a gun connected to the upper end of plug 17 past the check valve 34 and through the passage 32 into chamber 16 below the plug 17.

If, instead of successively distributing measured small quantities of lubricant to each of the ducts 21, 22, 23 and 24, it is desired to force lubricant into one of the ducts to the exclusion of the remainder, this may be done by rotating the plug 17 into such position as to aline the slot 25 in sleeve 20 with the desired duct 21, 22, 23 or 24 (cooperating indicating marks being provided on the plug 17 and stem 5 to enable the operator to effect alinement) and then forcing lubricant into and through the chamber 16 from a gun connected to the upper end of plug 17, all of the lubricant passing through passage 16 and then being delivered to the one particular duct in registration with the slot 25 in sleeve 20. This permits selective application of lubricant to any one of the ducts in any desired quantity without waste of lubricant in the other ducts.

Figure 6:
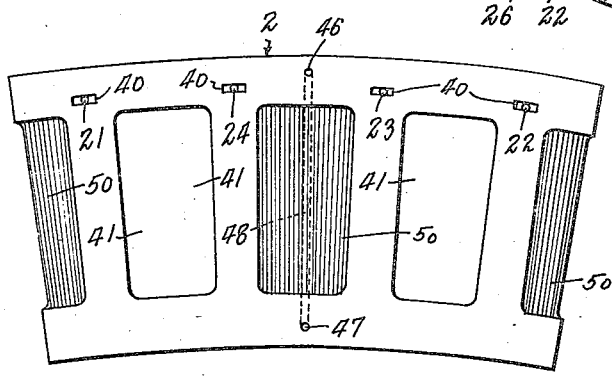
Fig. 6 is a developed view of the exterior bearing surface of the plug in the valve of Fig. 1.

Referring now to Figs. 5 and 6, each of the ducts 21, 22, 23 and 24 terminates at its outer end in a recess 40 in the bearing face of the plug, these recesses 40 being of relatively limited area and positioned at circumferentially spaced points around the plug 2 at a level above the port or passage 41, which extends through the plug and functions to conduct fluid through the valve when the latter is in open position.

Figure 7:
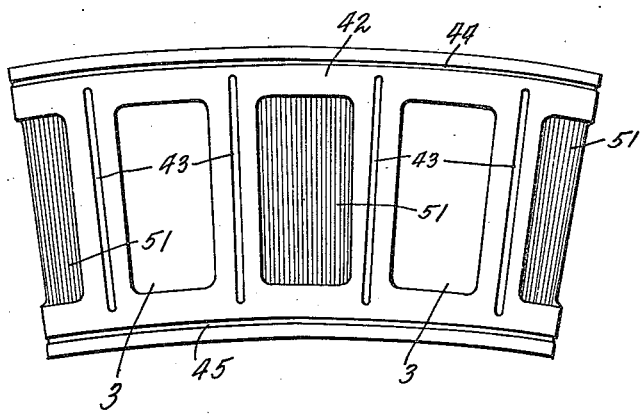
Fig. 7 is a developed view of the bearing surface of the valve body shown in Fig. 1.

Referring now to Fig. 7, the wall 42 of the conical opening 4 in the valve body 1 for receiving the plug 2, is provided with four vertically extending shallow grooves 43 positioned adjacent the opening of the fluid passage 3 extending through the body. These grooves 43 extend above and below the upper and lower edges, respectively, of the passage 3 and extend high enough to register with the recesses 40 in the plug when the plug is in any one of four positions of rotation. To open or close a plug valve of the type disclosed, the plug is rotated 90°. It may be always rotated in the same direction or it may be reciprocated back and forth through 90° to open and close the valve. In either event the recesses 40 are so oriented that when the plug is either in fully open or fully closed position, the recesses 40 register with the grooves 43. Therefore, when lubricant is supplied under pressure through any one of the four ducts 21, 22, 23 and 24, the lubricant is positively forced into one, and one only, of the four grooves 43, thereby insuring that sufficient lubricant pressure is developed in each groove to force the lubricant out of the groove between adjacent bearing surfaces of the valve body and the plug to free the plug and permit free rotation thereof.

It is often desirable to provide for additional lubrication of the plug and body bearing surfaces above and below the grooves 43. To this end I may provide a continuous circumferential groove 44 around the wall 42 above the upper ends of the vertical grooves 43 and a lower circumferential groove 45 positioned below the lower ends of the vertical grooves 43. These grooves 44 and 45 are supplied with lubricant through ports 46 and 47, respectively, in the plug 2, which ports are vertically positioned to register with the grooves 44 and 45. The ports 46 and 47 are interconnected with each other by a duct 48 extending through the plug 2 and, as shown in the drawing, are connected to the chamber 19 at a point therein above the sleeve 20 by a duct 49. The grooves 44 and 45 are therefore permanently in connection with the chamber 19 and whenever lubricant in chamber 19 is under pressure, lubricant will be forced to the grooves 44 and 45. Ordinarily very little lubricant will escape from the grooves 44 and 45 because they are positioned in the relatively rigid portions of the plug 2 above and below the passage 41 therein so that the pressure required to diffuse lubricant over the surfaces adjacent the vertical grooves 43 is less than that required to diffuse appreciable amounts of lubricant over the surfaces of adjacent grooves 44 and 45. However, a positive supply of lubricant to the grooves 44 and 45 is insured by virtue of the fact that with the slot 25 of sleeve 20 made narrower than the circumferential spacing between the ducts 21, 22, 23 and 24, as shown, during each complete rotation of the sleeve 20 there are four intervals when the slot 25 is out of registration with any one of the ducts 21, 22, 23 and 24. Therefore when the sleeve 20 is in those positions the only passage for escape of compressed lubricant in the chamber 19 is through the ducts 49 and 48 to the ports 46 and 47 and the grooves 44 and 45.

It is to be understood, however, that the passage 49 may enter the chamber 19 at a point within the vertical limits of the sleeve 20 so that it is closed by the sleeve except when the slot 25 in the latter is juxtaposed thereto. If this is done, the ports in the chamber 19 should be so spaced relative to the width of the slot 25 that the latter is in communication with at least one port in any position of the plug 17 so as to avoid creation of excessive lubricant pressures in chamber 16 as plug 17 is screwed down.

With the construction described, in which the lubricant pressure may be confined to any one of the vertical grooves 43, the pressure of the lubricant in such vertical groove may, if desired, be made sufficiently great to actually deform the plug and/or the valve body to cause a separation of the adjacent surfaces and permit extrusion of the lubricant therebetween. This would be impossible with the conventional construction in which lubricant is supplied simultaneously to all of the grooves because the lubricant would escape through the groove in the surfaces where the pressure was least, making it impossible to build up the pressure in the groove at the frozen surfaces sufficient to separate the latter.

It will be observed that the grooves 43 are spaced circumferentially a sufficient distance from the edges of the openings 3 in the body member and the recesses 40 are of such limited dimensions circumferentially that the recesses 40 are cut off from the grooves 43 before the plug has been rotated (during opening or closing movement of the valve) sufficiently to bring any of the grooves 43 into juxtaposed relation with the openings 41 or recesses 50 in the plug, thereby preventing waste of lubricant through the ducts 21, 22, 23 and 24, when grooves 43 are exposed to line fluid.

In accordance with the present invention, I provide shallow recesses in the valve body and plug surfaces between the line fluid passages therein, the recesses in the plug being juxtaposed to the fluid passage in the body and the recesses in the body being juxtaposed to the ports in the plug when the valve is closed. When the valve is open, the recesses in the plug and body, respectively, are juxtaposed to each other.

In Figs. 5 and 6 the recesses in the plug are indicated at 50 and in Fig. 7 the recesses in the body are indicated at 51. By providing these recesses 50 and 51 I have reduced the bearing surfaces to that portion which is useful for sealing the valve and preventing leakage. These recesses 50 and 51 are especially desirable when the line fluid is corrosive or contains grit or sand which will rapidly wear the sealing surface. When the line fluid is corrosive those portions of the wall of the body member 1 which are opposite the ends of the port 41 in the plug when the valve is closed are subject to corrosion due to the line fluid trapped in the plug passage. When these surfaces are corroded they cease to aid in the sealing of the valve and only increase the friction to rotation of the valve. If the line fluid contains grit or other abrasive material, the recesses in the walls of the plug and casing serve as traps for abrasive material and prevent wear. If these recesses 50 and 51 were not provided, then when the valve was in closed position the lubricant on the walls of the plug opposite the ports of the casing or body, as well as the lubricant on the walls of the casing opposite the ports of the plug, would be contaminated with grit or any abrasive materials in the line fluid. This abrasive material imbedded in the lubricant causes excessive wear and shortens the life of the valve. Provision of recesses 50 and 51, respectively, on the surfaces of the plug and body of the valve leads to a rapid loss of lubricant from the grooves 43 in the intermediate plug position due to the rush of line fluid. The lubricating device described permits assured replenishment of said grooves with lubricant in fully open and fully closed valve position. However, such recesses 50 and 51 are optional, and the method of lubrication described is useful whether or not said recesses 50 and 51 are provided.

As previously described with reference to Fig. 3, the sleeve 20 is provided with a tongue 201 for engagement with the slot 27 in the core 26, which tongue 201 is shown positioned opposite the slot 25 in the sleeve. An alternative construction for the sleeve is shown in Fig. 4 in which the sleeve 20', instead of being provided with a tongue opposite the slot 25' has the edges of the sleeve along the slot 25' turned inwardly to constitute two inwardly directed spaced apart tongues 201', which tongues are adapted to engage the recess 27 in the core 26. It has been previously stated that lubricant pressure within the chamber 19 tends to expand the sleeve 20 tightly against the cylindrical wall of chamber 19 so that there is substantial frictional resistance to rotation of the sleeve. When the rotating force is applied to the tongue 201 positioned opposite the slot 25, one-half of the sleeve 20 is in compression, which tends to further increase the bearing pressure between that half of the sleeve and the chamber 19, thereby further increasing the resistance to rotation of the sleeve. With the construction shown in Fig. 4, however, in which the rotary force applied by the core 26 to the sleeve 20' is always applied to one of the tongues 201', the entire sleeve is in tension rather than compression, tending to contract the sleeve rather than expand it, and thereby tending to reduce the frictional resistance to rotation.

Referring now to Figs. 8, 9, 10 and 11, a plug valve of slightly different construction and a modified form of lubricant-distributing mechanism is disclosed. The valve comprises a body 60 having a longitudinal fluid passage 61 extending therethrough and adapted to be connected at its opposite ends to two pipes. The body 60 is provided with a transverse conical passage 62 extending from the lower end almost, but not quite, through the top of the body and merging into a cylindrical passage 63 at the extreme upper end of the body. Positioned within the conical passage 62 and intersecting the fluid passage 61 is a conical plug 64 which plug has on its upper end a stem 65 having a cylindrical portion fitted snugly within the cylindrical passage 63 in the valve body and having a square or hexagonal outer end portion 66 projecting beyond the body 60 for receiving a wrench used to turn the plug into open or closed position. The lower end of the conical passage 62 of the valve body 60 is closed by a closure member or cover 67 secured in place by bolts 68 and sealed with the body by suitable gaskets 69. This cover member 67 contains a cylindrical central recess 70 in which is slidably mounted a pin 71, the upper end of which is provided with a ball seat 72 and a ball 73 is positioned between the seat 72 and a cooperating seat 74 in the plug 64. An adjusting bolt 75 is provided in the cover member 67 below the pin 71 for vertically adjusting the latter, to retain the plug 64 in sealing engagement with the wall of the conical passage of the body 60 in which the plug is positioned. When a suitable adjustment is obtained the bolt 75 is locked against further movement by a locknut 76. The space within the cover 67, being sealed from the exterior, a bleeder passage 77 may be provided in the plug extending from the port 78 in the plug to the lower face or end of the plug, thereby preventing the creation of pressures below the plug greater than those existing in the line in which the valve is connected.

For the purpose of lubricating the valve structure shown in Figs. 8 to 11, the stem 65 extending from the plug 64 upwardly out of the body 60 is counterbored from the top for a substantial distance to receive a rotatable shaft or hollow sleeve 80 having a lubricant passage 81 extending downwardly therethrough from the upper end to a point adjacent the bottom where it communicates with a transverse passage 82 extending out of the side of the sleeve 80. The lower end of the sleeve 80 is of reduced external diameter and is ground to fit accurately within a bushing 83 positioned in the lower end of the counterbore in the stem 65. The lower end of the counterbore and the external surface of the bushing 83 may be tapered as shown in the drawings to firmly anchor the bushing 83 in fluid-tight relation in the counterbore, the bushing being retained in place by a screw 84. The sleeve 80 is maintained in fixed vertical position with respect to the sleeve 83. Thus it is provided with a lower shoulder 85 which rests upon the top edge of the bushing 83 and is provided with an upper shoulder 86 which is flush with a shoulder 87 in the stem 65. A washer 88 and packing 88a are compressed against the shoulders 86 and 87 by a packing gland 89 thereby not only retaining the sleeve 80 in lowermost position with its shoulder 85 resting on the top of the bushing 83 but also effecting a self-closing fluid-tight seal between the upper end of the stem 65 and the sleeve.

Attached to the upper end of the sleeve 80 as by screw-threads 90 and a lockpin 91, is a radially extending hollow arm 92 having a passage 93 therein in communication with the passage 81 in sleeve 80. A ball check valve 94 is preferably inserted between the passages 81 and 93 to prevent escape of fluid from the valve out through those passages. The passage 93 merges into a relatively large threaded passage 95 containing a lubricant-compressing plug 96.

The bushing 83 (Fig. 9), is provided with four ports 97, 98, 99 and 100, positioned at 90° intervals thereabout at the level of the transverse passage 82 in sleeve 80 so that by rotating sleeve 80 the passage 82 may be brought into registration with any one of the ports 97, 98, 99 and 100. The latter ports connect with passages 101 (Fig. 10), 102, 103, and 104, respectively, in the plug 64, which passages extend to recesses 105, 106, 107 and 108, respectively positioned at circumferentially spaced points in the upper end of the bearing surface of the plug 64 above the fluid passage 78 therein. Therefore by rotating the arm 92 and the sleeve 80 into a position to register the passage 82 in sleeve 80 with any one of the ports 97, 98, 99 or 100, and then screwing in the lubricant-compressing plug 96, lubricant may be selectively forced under high pressure to any one of the recesses 105, 106, 107 or 108 in the upper bearing surface of the plug 64.

I preferably provide check valves 109, at the outer ends of the ports 97, 98, 99 and 100, respectively, for preventing return flow of fluid through those passages. These check valves 109 preclude equalization of pressures in the ducts 104, 105, 106 and 107 by repeated registry through port 82 with chamber 81, which is possible in the construction previously described with reference to Figs. 1, 2 and 5, where no check valves are shown in passages 21, 22, 23 and 24.

In the valve shown in Figs. 8, 9, 10 and 11, there are no lubricant grooves in the bearing surface of the valve body, all of the lubricant-distributing grooves being in the bearing surface of the plug and these grooves being out of direct communication with the recesses 105 to 108, inclusive, to which lubricant is delivered. However, at least a portion of each of the lubricant-distributing grooves is positioned adjacent at least one of the adjacent ports, and in turn is supplied with lubricant from the adjacent recess by seepage of the lubricant past the bearing surfaces separating the recess from the groove.

Thus referring to Fig. 11, the plug is provided with an upper lubricant groove 110 and a plurality of vertically extending grooves 111, the upper end of each of which divides into two grooves 112 and 113, respectively extending adjacent and below the associated recess 105, 106, 107 or 108. I prefer to also provide a set of recesses 114, 115, 116 and 117 adjacent the lower end of the bearing surface of the plug and below the recesses 105, 108, 107 and 106, respectively, each of these lower recesses being directly connected by a duct to the recess directly thereabove at the top of the plug. Thus the recess 105 is connected to the recess 114 by a duct 118. The recess 115 is connected to the recess 108 by a duct 119; the recess 116 is connected to the recess 107 by a duct 120; and the recess 117 is connected to the recess 106 by duct 121.

The lower end of each of the vertical grooves 111 also merges into two branches 122, 123, respectively, extending above and adjacent one of the lower recesses 114, 115, 116 or 117, and a lower lubricant groove 124 is provided extending circumferentially about the plug below the recesses 114 to 117, inclusive.

In the operation of the valve shown in Figs. 8 to 11, the space 95 in arm 92 is filled with lubricant as by removing the plug 96, placing a pellet of lubricant in passage 95, and re-inserting plug 96. The arm 92 is then rotated to bring the port 82 into registration with one of the passages 97 to 100, inclusive, and lubricant forced through that port and through the associated passages to the recesses 105 and 114, or 106 and 115, or 107 and 116, or 108 and 117, as the case may be. Sufficient pressure may readily be applied to the lubricant to cause it to slightly separate the juxtaposed bearing surfaces surrounding the recesses and permit seepage of the lubricant past those bearing surfaces into the grooves 110, 112, 113, 124, 122, 123. The lubricant moves readily through the grooves, filling them and then spreading from the edges of the grooves over the adjacent portions of the bearing surfaces of the plug and valve body. Lubricant may be distributed to each of the four sets of recesses in turn by rotating the arm 92 into the necessary positions. In order to facilitate orientation of the passage 82 with the ports 97, 98, 99 and 100, the upper end of the valve stem 66 may be provided with suitable indicating marks 130 and the arm 92 may be provided with a cooperating indicator 131.

It often happens in plug valves of the type referred to that the bearing surfaces will be in metal-to-metal contact, or be frozen together by rust or corrosion at only one circumferential point. This may be readily determined when lubricating the valve as described with reference to Figs. 8 to 11. When the arm 92 is in position to supply lubricant to recesses adjacent bearing surfaces having clearance therebetween very little resistance to the flow of lubricant is encountered and the lubricant-compressing plug 96 will turn easily, thereby indicating to the operator that the bearing surfaces at that point on the plug are free. However, when the arm 92 is turned into a position to register the passage 82 with the port connected to recesses in a portion of the bearing surface which is frozen, the resistance to rotation of the plug 96 will be much greater. The operator is therefore immediately informed as to which portion of the bearing surfaces require lubricant and he can produce as great a pressure as is needed to separate and lubricate the frozen portion of the bearing surface without wasting lubricant by extrusion past the portions of the bearing surfaces which are already free. The device shown in Fig. 8 may be operated manually to repeatedly force approximately equally small portions of lubricant into each of the ducts 101, 102, 103 and 104. Thus by successively rotating the screw 96 through a predetermined angle with respect to the member 92, then swinging the member 92 through 90° repeatedly, the operator may feed successively and repeatedly small portions of lubricant into each of the ducts 101—104, and do it with a frequency sufficiently fast to adequately release the plug, irrespective of on which side of the plug the pressure between the plug and seat is relatively small or large. The arrangement also permits of turning the screw 96 to compress the lubricant without disturbing registration of the port 82 with any one of the ducts 101—104. However, the rapid successive feeding of lubricant to successive ducts 101—104 is greatly facilitated by the fact that force required to rotate both the screw 96 in the member 92 and to swing the member 92 to rotate the member 80, may be applied to the single element 96.

An advantage of the construction depicted particularly in Fig. 11, in which the recesses 105 to 108 and 114 to 117, inclusive, are not connected directly to the various lubricant grooves in the face of the plug, is that regardless of the position of the plug between fully opened and fully closed positions, pressure of the line fluid is never applied directly to the lubricant in said recesses.

It is to be understood that although in both of the valves shown in the drawings provision has been made for distributing lubricant independently to four circumferentially spaced apart areas on the plug, this number may be increased or decreased as necessary or desirable. In general, I have found that at least four separate sets of grooves to which lubricant may be independently distributed is desirable and that this number usually suffices for small and medium sized valves. It is to be understood, however, that in case of large valves or bearings it may be advantageous to independently distribute lubricant to five, six, or even a greater number of separate sets of grooves.

It is to be understood that although for purposes of illustrating the invention it has been described in detail as applied to valves of the plug type, that the invention is not limited to lubrication of the bearing surfaces of plug valves, but is applicable to any and all bearing structures where the same problems exist, namely, that of supplying lubricant to all portions of the bearing surfaces irrespective of different bearing pressures thereover, and of releasing and lubricating the bearing surfaces that may be frozen or stuck over a portion or all of their area. The invention is, therefore, to be limited only to the extent set forth in the appended claims.

I claim:

1. In combination, a pair of relatively movable members having cooperating bearing surfaces to be lubricated at a rest position, means movable to force lubricant between said bearing surfaces and means coupled to said lubricant-forcing means for movement therewith for distributing said lubricant to a plurality of different spaced apart points thereon, while said members are at rest.

2. In combination, a pair of relatively movable members having cooperating bearing surfaces to be lubricated, one of said members having a plurality of ducts therein extending to different spaced apart points on said bearing surface, a reservoir for lubricant in communication with said ducts, means movable in said reservoir for forcing lubricant therefrom into said ducts, and means responsive to movement of said lubricant forcing means for successively closing different ducts, whereby lubricant may be at any given instant forced into less than all of said ducts.

3. In combination, a pair of relatively movable members having cooperating bearing surfaces to be lubricated, one of said members having a plurality of ducts therein extending to different spaced apart points on said bearing surface, a reservoir for lubricant, a cylindrical chamber in communication with said reservoir, said ducts communicating with said chamber through the cylindrical wall thereof at circumferentially spaced points, means rotatable in said reservoir for forcing lubricant into said chamber, a split sleeve in said chamber sealing with the cylindrical wall thereof and adapted to simultaneously cover and close a portion of said ducts, means for rotating said sleeve in response to rotation of said lubricant-forcing means, whereby different ducts are successively communicated with said chamber as said lubricant-forcing means is rotated.

4. The combination as defined in claim 3 in which said split sleeve is deformable, whereby it is expanded and forced tightly against said chamber while in response to pressure of lubricant therewithin.

5. In combination, a pair of relatively movable members having cooperating bearing surfaces to be lubricated, one of said members having a plurality of ducts therein extending to different spaced apart points on said bearing surface, a single means for supplying lubricant under pressure to said ducts one at a time, and means responsive to mechanical rotation of said single means for sealing those ducts to which lubricant is not being supplied.

6. In combination, a pair of relatively movable members having cooperating bearing surfaces to be lubricated, rotatable means having a common lubricant passage therein mounted on one of said members, said member having a plurality of lubricant ducts therein adapted to be selectively communicated with said common passage one at a time in different positions of rotation of said rotatable means, said ducts extending to different spaced apart points on said bearing surfaces, and means for feeding lubricant under pressure through said common passage independently of the position of said rotary member, each of said spaced-apart points remaining within the contact areas of said members in all relative positions thereof and being isolated from each other by unrecessed portions of said surfaces in at least two terminal rest positions of said members.

7. The combination as defined in claim 6, in which said means for feeding lubricant under pressure through said common passage comprises an arm secured to and extending at an angle from said rotatable means exterior of said one bearing member, and means movable with respect to said arm for forcing lubricant under pressure through said arm and said rotatable means to said common passage.

8. A valve comprising a pair of relatively movable members having cooperating contact surfaces fitted together to effect a fluid-tight seal therebetween in which one at least of said contact surfaces has a plurality of separate spaced apart recesses therein isolated one from another, and means for expelling lubricant under pressure from said recesses between the adjacent contact-surfaces, one at a time, in at least two terminal rest positions of said members.

9. A valve comprising a body member and a plug member rotatable therein, said members having cooperating sealing surfaces, said body member having a passage intersecting the sealing surface thereof, said plug member having a fluid passage therein adapted to register with the fluid passage in said body member when the valve is in open position, the plug presenting an imperforate surface to said passage in the body member when the valve is in closed position, a circumferential groove in the sealing surface of one of said members spaced longitudinally from the fluid passage therein, longitudinal grooves in the sealing surface of said member spaced circumferentially from the opening of the fluid passage therein, a duct in said other member registering with said circumferential groove in all positions of said valves, other ducts in said other member registering with said longitudinal grooves in predetermined relative positions of said members, means for supplying lubricant under pressure to said first mentioned duct, and means for supplying lubricant under pressure to said second mentioned ducts one at a time.

10. A valve as described in claim 9 with means for automatically positively supplying lubricant under pressure to said second mentioned ducts at spaced intervals, one at a time, and for automatically positively forcing lubricant under pressure to said first mentioned duct during the intervals between application of lubricant to said first mentioned ducts.

11. In combination, a pair of relatively movable members having cooperating bearing surfaces in which one at least of said bearing surfaces has an isolated recess therein for receiving and distributing lubricant, a second recess in one of said bearing surfaces separated from said first recess by portions of the cooperating bearing surfaces of the members, and means for supplying lubricant under pressure to said second recess whereby said lubricant is extruded between said bearing surfaces into said first recess and then extruded from all margins of the first recess to the adjacent bearing surfaces.

12. In combination, a pair of relatively movable members having cooperating bearing surfaces, in which one at least of said bearing surfaces has a plurality of spaced apart isolated recesses therein for receiving and distributing lubricant, and an additional recess separated from said first recesses by portions of the cooperating bearing surfaces of the members, and means for supplying lubricant under pressure to said additional recess whereby it is extruded between said bearing surfaces into said first recesses and then extruded from all margins of said first recesses adjacent the bearing surfaces.

13. A valve comprising a body member and a plug member rotatable therein, said members having cooperating ports therein and cooperating sealing surfaces surrounding said ports, a lubricant groove extending circumferentially in the sealing surface of one member at a point beyond the port therein, a second lubricant groove isolated from said first groove and extending longitudinally adjacent to the port in that member, a recess in the surface of said member positioned between said grooves, but separated therefrom by sealing surfaces of said member, and means for supplying lubricant under pressure to said recess.

14. In combination, a pair of relatively movable members having cooperating bearing surfaces to be lubricated, said members defining a plurality of spaced apart recesses included within the boundary of the bearing surfaces and also defining a continuous recess spaced-apart from said plurality of recesses and extending along the boundary of said surfaces and in closer proximity to said boundary than said plurality of recesses, means for feeding lubricant under pressure to said plurality of recesses repeatedly in predetermined relative amounts, whereby said lubricant enters between spaced-apart regions of said surfaces, said continuous recess trapping lubricant which moves through said spaced-apart regions consecutively to said boundary.

15. A lubricated tapered plug valve comprising a body member and a plug member having cooperating tapered bearing surfaces and means for urging said plug member into seating relation with said body member, in which said members define a lubricant recess symmetrically disposed around the axis of the plug, and a plurality of lubricant recesses, each asymmetrical with respect to the axis of the plug, and means for feeding lubricant under pressure to said symmetrical recess and consecutively to each of said asymmetrical recesses, whereby forces in different radial directions may be consecutively applied between said members.

16. A lubricated plug valve including a body member and a plug member having cooperating bearing surfaces, in which said members define at least three separated lubricant cavities substantially uniformly spaced around the axis of the plug and each completely surrounded by mating surfaces of the plug and body members at least when the valve is in two operative rest positions, and means for successively feeding lubricant under pressure to said separated cavities at least when said valve is in two operative rest positions, whereby distribution of lubricant between the bearing surfaces on both sides of any plane through the axis of the plug is insured.

17. A valve comprising a body member having a line fluid passage and a closure member movable with respect to said body member to control line fluid flow through said passage, said members having cooperating bearing surfaces, and means for positively feeding lubricant to each of a plurality of spaced apart points on said bearing surfaces in predetermined relative amounts.

18. In a lubricated plug valve, a body member and a plug member having cooperating mating surfaces, said members defining a recess extending circumferentially and a recess extending longitudinally in said mating surfaces, said recesses being isolated from each other when the valve is in closed position, and means for supplying lubricant under pressure to each of said recesses separately from a common source, at least in said closed position.

19. A lubricated plug valve comprising a body member and a plug member having cooperating sealing surfaces and having cooperating line fluid passages extending through each member to the sealing surface thereon, said members defining separate lubricant recesses positioned on opposite side of one of the fluid passages in said body member when the valve is in closed position, said recesses being isolated from each other by mating portions of the sealing surfaces of said members, and means for forcing lubricant into each of said recesses separately in said closed position, whereby lubricant is positively supplied to both of the said recesses and positively extruded between the sealing surfaces on opposite sides of said one body passage.

20. A valve comprising a body member having a plug cavity therein and a plug rotatable in the plug cavity, said body member having a fluid passage extending from the plug cavity and said plug having a port extending therethrough registering with said body passage when the valve is in open position of rest, the plug blocking said fluid passage in the body member and the body member blocking said fluid passage in the plug when the valve is in closed position of rest; in which the surface of said plug registering with said body passage and the surface of said body member registering with said plug passage when the valve is in closed position, are recesesd, said recesses and said ports being separated from each other by cooperating mating surfaces on said plug and body members, said sealing surface on either said body member or said plub containing a plurality of longitudinal groves, each positioned between one of said ports and one of said recesses, and being completely surounded by mating surfaces of said plug and body when the valve is in said positions of rest, and means for forcing lubricant into said grooves one at a time, whereby lubricant is positively supplied to the sealing surfaces adjacent each groove irrespective of differences in the resistances to lubricant flow from different grooves, when said valve is in one of said rest positions.

21. A valve comprising a body member and a plug member rotatable therein, said members having cooperating ports therein and cooperating sealing surfaces surrounding said ports, a first lubricant recess in the sealing surface of one member at a point beyond the port-swept area of said members, a second lubricant recess in one of said members isolated from said first recess by a portion of the sealing surface, and extending into the port-swept area of said members, and means for forcing lubricant to said first recess, whereby said lubricant is extruded between said sealing surfaces from said first recess to said second recess, and then extruded from the margins of the second recess to the adjacent sealing surfaces.

22. The method of lubricating a pair of relatively rotatable members having cooperating bearing surfaces, said method comprising positively forcing a viscous lubricant between said bearing surfaces at each of three or more points thereon substantially uniformly spaced about the axis of rotation, whereby supply of lubricant between said bearing surfaces on both sides of any diametrical and axial plane is insured.

23. In combination, a pair of relatively movable members having cooperating bearing surfaces to be lubricated in a plurality of different stop positions and means for forcing lubricant to a plurality of different points on said bearing surfaces at independent pressures while said members are in at least two successive ones of said stop positions, each of said points being surrounded and separated from the other point by mating portions of said bearing surfaces when said members are in said two successive stop positions.

24. In combination, a pair of relatively rotatable members having cooperating thrust bearing surfaces limiting axial motion between said members, and means for forcing lubricant between said bearing surfaces consecutively at a plurality of circumferentially spaced-apart points thereon one at a time in each operative position of said members, said points being separated from each other by mating portions of said bearing surfaces surrounding each said point in each of said positions.

25. In combination, a pair of relatively rotatable members having cooperating bearing surfaces and means for forcing lubricant between said bearing surfaces at a plurality of circumferentially spaced, isolated points thereon one at a time, said points being separated from each other and from the margins of the bearing surfaces by mating portions of said bearing surfaces in all positions of relative rotation of said members.

26. In combination, a pair of relatively movable members having cooperating bearing surfaces and means for positively feeding lubricant to each of a plurality of spaced-apart points on said bearing surfaces in predetermined relative amounts.

27. In combination, a pair of relatively rotatable members having cooperating bearing surfaces to be lubricated, and means for positively forcing lubricant between mating portions of said bearing surfaces surrounding each of three or more points thereon substantially uniformly spaced about the axis of rotation, whereby distribution of lubricant between the bearing surfaces on both sides of any plane through the axis of the plug is insured.

WLADIMIR M. ZAIKOWSKY